April 27, 1965 E. D. NUTTALL 3,181,168

MAGNETIC RECORDING SYSTEM AND METHOD

Filed Sept. 27, 1960

INVENTOR

Edwin D. Nuttall

BY Adolph C. Hugin

ATTORNEY

United States Patent Office 3,181,168
Patented Apr. 27, 1965

3,181,168

MAGNETIC RECORDING SYSTEM AND METHOD

Edwin D. Nuttall, Shreveport, La., assignor to United Gas Corporation, a corporation of Delaware Filed Sept. 27, 1960, Ser. No. 58,764
5 Claims. (Cl. 346—74)

This invention relates to improved magnetic tape recorders and methods of making magnetic recordings. It is particularly directed to an arrangement for improved magnetic recordation utilizing a plural track head in a recorder constructed and energized to provide well defined discrete magnetic record bits in a plurality of transversely adjacent tracks in the tape and to minimize cross-talk between tracks.

In recording information in tracks and particularly where the record is made by discrete magnetized bits in a plurality of transversely spaced tracks on a magnetic tape, it is highly desirable to minimize cross-talk between tracks so that the bits in the different tracks will have well defined longitudinal lines separated by a well defined guard band between adjacent tracks. According to the present invention, this highly improved definition of the bits in a magnetic tape having a plurality of transversely spaced tracks is obtained by providing a plural track recording head for recording magnetic bits in different tracks in a magnetic memory member, such as a magnetic tape, where in individual bits in different tracks and combinations of bits in different tracks represent specific coded information symbols and the combination of bits in different tracks for the specific symbols are aligned transversely of the tape for each symbol. The improvement provided by the present invention in this type of recording is obtainable by the use of a plural track recording head which is constructed and energized so that the leading edge of all bits will have the same polarity and the trailing edge of all bits also will have the same polarity. This has been found to be particularly useful in "return-to-zero" type of magnetic recording, but is not necessarily limited thereto.

An object of this invention is to provide an improved magnetic recorder.

Another object of this invention is to provide an improved magnetic recording system comprising a movable recording medium with means for forming a plurality of transversely spaced record tracks of discrete magnetized bits.

A further object of this invention is to provide an improved method of magnetic recording comprising making a plurality of spaced tracks of discrete magnetized bits representing stored information and magnetizing all bits in the same polarity of relationship in all tracks whereby all bits in all tracks have like polarity leading edges and like polarity trailing edges.

Still another object of the present invention is to provide an improved method of magnetic recording in a return-to-zero system wherein a plurality of transversely spaced tracks of discrete magnetized bits are formed by magnetizing all the bits comprising each specific symbol in substantial transverse alignment and in the same polarity relationship in all tracks so as to have magnetically distinct adjacent longitudinal side edges for all bits.

Further objects and advantages of this invention will become apparent from the following description referring to the accompanying drawing, and the features of novelty which characterize this invention will be pointed out with particularity in the claims appended to and forming a part of this specification.

Figure 1:
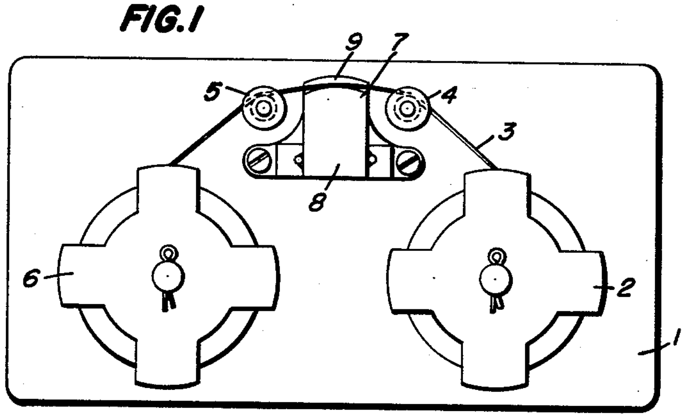
FIG. 1 is a side elevational view of a magnetic recorder utilizing the present invention.
Figure 2:
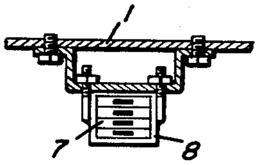
FIG. 2 is a plan view of the recording head shown in FIG. 1 with the mounting thereof partly broken away to illustrate the bit arrangement of such a head.

Referring to the drawing, a magnetic recorder 1 is shown which is provided with a supply reel 2 of magnetic tape 3 which is fed over guide rollers 4 and 5 on to a take-up reel 6. As the tape passes from the supply reel 2 to the take-up reel 6, it traverses the recording face 7 of a plural track recording head 8 and preferably is biased into light contact with the recording head face 7 by a suitable resiliently biased guide pad 9.

The plural track recording head 8 comprises a plurality of separate transversely arranged recording magnetic circuits which, in the illustrated embodiment, include four separate magnetic members 10 which are adapted to be energized by separate magnetizing coils 11 all wound in the same manner and connected in the same manner, as in parallel, to a suitable source of energization, such as an electric battery 12.

In order to provide for the recordation of discrete magnetized bits in a movable recording medium, the individual magnetic member coils 11 are adapted to be individually energized by suitable individual switches 13. The intensity of the magnetization of each bit is substantially the same in that the magnetic members 10 and their magnetizing coils 11 have substantially the same electromagnetic properties and are all connected to the same energizing source 12 through a single suitable current-limiting resistor 14. The magnetic recorder 1 may be provided with any suitable arrangement, such as the take-up reel 6, for advancing the magnetic tape 3 across the recording head 4 in a regular intermittent manner after or during each energization of the coils 11 and provided with suitable means, like a switch 13' in the common line of all of the coils 11, for limiting the period of energization, such as is disclosed in copending application Serial No. 857,452, now abandoned, John R. Davis et al., filed December 4, 1959, and assigned to the same assignee as the present application. This provides uniform spacing between longitudinally adjacent magnetized bits in the movable magnetic tape which comprises the magnetic recording medium in which the information is stored. In this maner, any known code, such as 1–2–4–8 code, can thus be utilized to provide for digital recording and storing of information together with additional operating instructions.

Such a magnetic recorder may be of any desired conventional type, such as the return-to-zero type, which normally utilizes a degaussed tape, and preferably is of this type. As is more clearly shown in FIGS. 3 and 4, the energization of any number or all of the coils of the recording head, by closure of the appropriate switches 13, will form discrete magnetized bits 15 in the magnetic tape 3, and the excitation of all of the electromagnetic members 10 in the same respective polarity relationship by the magnetizing coils 11 connected in the same relationship to the source of energization 12 provides discrete bits 15 in which all of the bits in all four tracks 16 have the same polarity relationship, so that all substantially transversely aligned bits comprising a specific coded symbol have the same polarity leading edges and the same polarity trailing edges.

Figures 3, 4, 5:
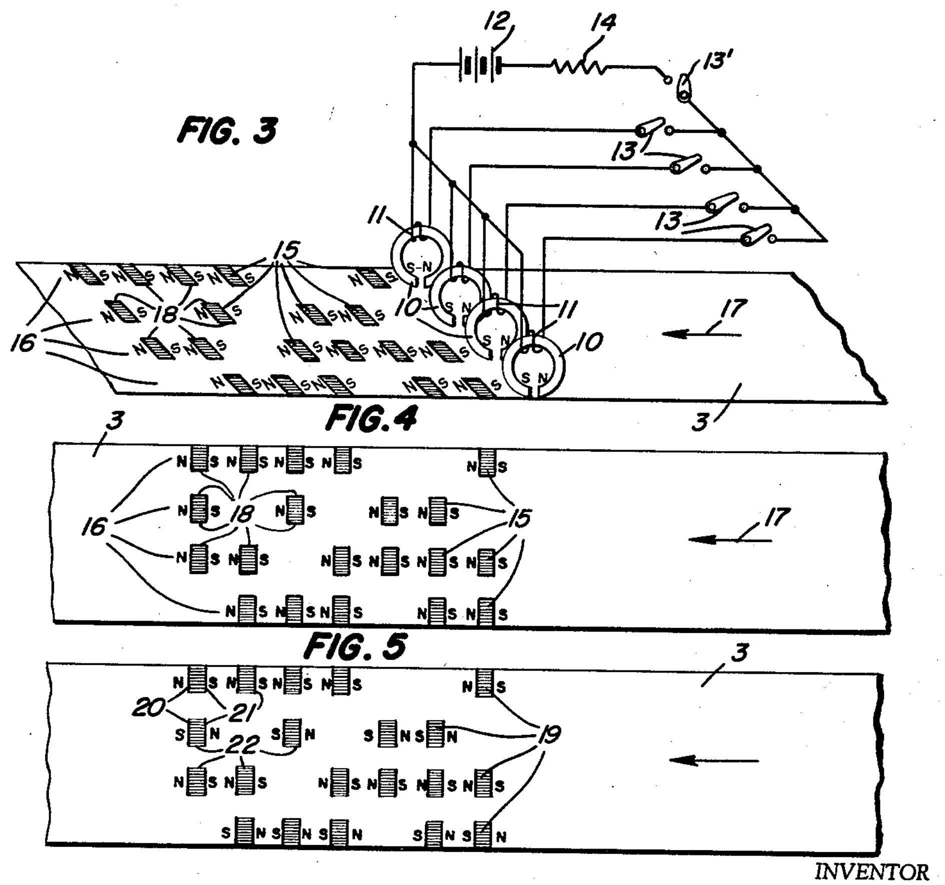
FIG. 3 is a schematic diagram illustrating a recording system utilizing the present invention.
FIG. 4 is an enlarged plan view of a section of magnetic tape illustrating the arrangement of discrete magnetized bits in the tape formed in accordance with the present invention.
FIG. 5 is an enlarged view of a section of magnetic tape, similar to that shown in FIG. 4, wherein the magnetized bits in the tape are made in the conventional manner.

As shown in FIGS. 3 and 4, when the magnetic tape 3 moves in the direction indicated by the arrow 17, the leading edges of all discrete bits in all tracks will have a north polarity and all trailing edges of all bits in all tracks will have a south polarity. An opposite polarity arrangement of the discrete bits in all cases could equally well be used. These magnetic bits are indicated on the magnetic tape 3 in FIGS. 3 and 4 as small rectangles, and cross flux between substantially transversely adjacent magnetized bits is minimized due to the fact that like poles repel and each part of each discrete bit is of like polarity to a transversely adjacent corresponding part of a transversely adjacent bit in the adjacent track.

This magnetic recording system provides well defined longitudinal edges or lines 18 for all magnetized bits and thereby forms a well defined guard band between adjacent tracks 16. This is highly important in that it provides far greater accuracy in the recording and also in the operation of the playback coincident and anti-coincident circuits used in interpreter units which provide for the utilization of the stored information of the magnetic tape in conventional binary digital computers.

FIG. 5 illustrates the conventional type of magnetic recording which is obtainable by conventional methods, where a plural head recorder is used and discrete bits 19 in adjacent tracks have opposite polarity leading edges 20 and opposite polarity trailing edges 21. As can be seen in this figure, the discrete bits do not have definite longitudinal edges or lines 22 so that the guard band between adjacent tracks is not well defined, as in a recording made in accordance with the present invention and illustrated in FIGS. 3 and 4. Such recordings have actually been made and photographs of both types of recordings form the bases for these two figures.

Thus, it is seen that by using an apparatus made in accordance with the present invention operated according to the improved method of magnetic recording, a definite improvement is obtained in the stored information in a recording medium having a magnetizable portion wherein a plurality of transversely spaced tracks are used to store the information in the form of discrete magnetized bits where all bits are in the same polarity of relationship in all tracks, whereby all bits in all tracks have like polarity leading edges and like polarity trailing edges with magnetically distinct adjacent longitudinal side edges.

While a particular embodiment of this invention has been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. A magnetic recorder comprising a plural track head for making a plurality of transversely spaced record tracks of discrete magnetized bits on a magnetic recording medium, and means for exciting said head with the same magnetic polarity relationship for each track whereby all bits in all tracks have like polarity leading edges and like polarity trailing edges with distinct longitudinal side edges.

2. A magnetic recording system comprising a movable recording medium having a magnetizable surface portion, means comprising a plurality of transversely arranged electromagnetic members for making a plurality of transversely spaced record tracks of substantially transversely aligned discrete magnetized bits in said magnetizable surface portion of said medium, and means for energizing all of said electromagnetic members in the same polarity relationship whereby all bits in all tracks have the same polarity relationship so that substantially transversely aligned bits have like polarity leading edges and like polarity trailing edges.

3. A magnetic recorder comprising means for making a plurality of transversely spaced record tracks of substantially transversely aligned discrete magnetized bits on a magnetic recording medium representing stored information with a substantially unmagnetized space band therebetween, and means for exciting said record track-making means in the same magnetic polarity relationship for each track whereby all bits made in all tracks have like polarity leading edges and like polarity trailing edges with distinct longitudinal side edges and minimal cross magnetic flux between said side edges in said space band.

4. The method of magnetic recording in a return-to-zero system comprising making a plurality of transversely spaced longitudinally extending record tracks of discrete magnetized substantially transversely aligned bits in said spaced tracks representing stored information and magnetizing all bits in the same polarity relationship in all tracks so that transversely aligned adjacent bits in adjacent tracks have like polarity leading edges and like polarity trailing edges.

5. The method of magnetic recording comprising arranging a recording medium having a magnetizable surface portion adjacent to means for making a plural magnetic track record, making a plurality of spaced tracks of discrete magnetized bits representing stored information on the magnetizable surface portion of the recording medium and magnetizing all bits in the same polarity relationship in all tracks whereby all bits in all tracks have like polarity leading edges and like polarity trailing edges with magnetically distinct adjacent longitudinal side edges.

References Cited by the Examiner

UNITED STATES PATENTS

| | | | |
|---|---|---|---|
| 2,698,875 | 1/55 | Greenwood | 346—74 |
| 2,767,243 | 10/56 | Steeneck | 346—74 |
| 2,876,058 | 3/59 | Kenosian et al. | 346—74 |
| 2,937,366 | 5/60 | Sims | 346—74 X |
| 2,972,736 | 2/61 | Hersh | 346—74 |

IRVING L. SRAGOW, *Primary Examiner.*

NEWTON N. LOVEWELL, ELI J. SAX, *Examiners.*